United States Patent
Bradley

(10) Patent No.: US 10,794,469 B2
(45) Date of Patent: Oct. 6, 2020

(54) GEARED GAS TURBINE ENGINE

(71) Applicant: ROLLS-ROYCE PLC, London (GB)

(72) Inventor: Jonathan P Bradley, Bristol (GB)

(73) Assignee: ROLLS-ROYCE plc, London (GB)

( * ) Notice: Subject to any disclaimer, the term of this patent is extended or adjusted under 35 U.S.C. 154(b) by 1037 days.

(21) Appl. No.: 15/155,398

(22) Filed: May 16, 2016

(65) Prior Publication Data

US 2016/0363211 A1 Dec. 15, 2016

(30) Foreign Application Priority Data

Jun. 10, 2015 (GB) .................................. 1510050.6

(51) Int. Cl.
*F16H 57/04* (2010.01)
*F02C 3/04* (2006.01)
(Continued)

(52) U.S. Cl.
CPC ........... *F16H 57/0479* (2013.01); *F02C 3/04* (2013.01); *F02C 7/36* (2013.01); *F16H 1/28* (2013.01);
(Continued)

(58) Field of Classification Search
CPC ............. F16H 57/0479; F16H 57/0486; F16H 57/0476; F16H 57/08; F16H 57/082;
(Continued)

(56) References Cited

U.S. PATENT DOCUMENTS

| | | | |
|---|---|---|---|
| 4,271,928 A | * | 6/1981 | Northern ................. B64C 27/12 184/6.11 |
| 4,799,354 A | | 1/1989 | Midgley |

(Continued)

FOREIGN PATENT DOCUMENTS

| | | |
|---|---|---|
| EP | 1703174 A1 | 9/2006 |
| EP | 1876338 A2 | 1/2008 |

(Continued)

OTHER PUBLICATIONS

Dec. 7, 2015 Search Report issued in British Patent Application No. 1510050.6.

(Continued)

*Primary Examiner* — Ehud Gartenberg
*Assistant Examiner* — Jacek Lisowski
(74) *Attorney, Agent, or Firm* — Oliff PLC

(57) ABSTRACT

A gas turbine engine includes a gearbox including a sun gear, annulus gear, plurality of planet gears and a planet gear carrier. Each planet gear is rotatably mounted in the planet gear carrier by a planet gear bearing. A lubrication system is arranged to supply lubricant to the planet gear bearings and at least one of the sun gear, the planet gears and the annulus gears. The planet gear carrier includes an annular extension. The lubrication system includes an annular member arranged around annular extension to define an annular chamber which is sealed at its ends to the planet gear carrier and which contains a reserve of lubricant. The annular member has an inlet to supply lubricant into the annular chamber and the planet carrier has a first passage to supply lubricant to the sun, planet or annulus gear and a second passage to supply lubricant to planet gear bearings.

21 Claims, 4 Drawing Sheets

(51) Int. Cl.
*F02C 7/36* (2006.01)
*F16H 1/28* (2006.01)
*F16H 57/08* (2006.01)

(52) U.S. Cl.
CPC ....... *F16H 57/043* (2013.01); *F16H 57/0486* (2013.01); *F16H 57/082* (2013.01); *F05D 2260/40311* (2013.01); *F05D 2260/98* (2013.01); *F16H 2057/085* (2013.01)

(58) Field of Classification Search
CPC .... F16H 57/085; F16H 57/087; F16H 57/043; F16H 57/04; F16H 3/44; F16H 3/426; F16H 3/442; F16H 1/28; F16H 2057/085; F16H 57/0453; F16H 57/0482; F05D 2260/40311; F05D 2260/98; F05D 2260/4031; F05D 2260/0443; F01D 25/18; F01D 25/16; F01D 25/20; F02C 7/36; F02C 3/04
USPC ........................................................ 475/159
See application file for complete search history.

(56) References Cited

U.S. PATENT DOCUMENTS

| | | | |
|---|---|---|---|
| 4,827,712 A | 5/1989 | Coplin | |
| 5,107,676 A | 4/1992 | Hadaway et al. | |
| 8,205,432 B2 | 6/2012 | Sheridan | |
| 8,484,942 B1 | 7/2013 | McCune et al. | |
| 2009/0247348 A1 | 10/2009 | Haupt et al. | |
| 2012/0192570 A1 | 8/2012 | McCune et al. | |
| 2013/0225353 A1* | 8/2013 | Gallet | F16H 57/0423 475/159 |
| 2014/0150401 A1 | 6/2014 | Venter | |
| 2014/0161591 A1* | 6/2014 | Venter | F01D 25/20 415/122.1 |
| 2016/0377165 A1* | 12/2016 | Sheridan | F16H 57/0486 60/226.1 |

FOREIGN PATENT DOCUMENTS

| | | |
|---|---|---|
| EP | 2327859 A2 | 6/2011 |
| FR | 2987417 A1 | 8/2013 |
| GB | 2073365 A | 10/1981 |
| WO | 2006/059981 A1 | 6/2006 |
| WO | 2011/120771 A1 | 10/2011 |
| WO | 2013/141931 A1 | 9/2013 |
| WO | 2014/007881 A2 | 1/2014 |
| WO | 2014/011245 A2 | 1/2014 |
| WO | 2014/055122 A1 | 4/2014 |
| WO | 2014/099087 A2 | 6/2014 |

OTHER PUBLICATIONS

Jan. 11, 2017 Search Report issued in European Patent Application No. 16169749.

\* cited by examiner

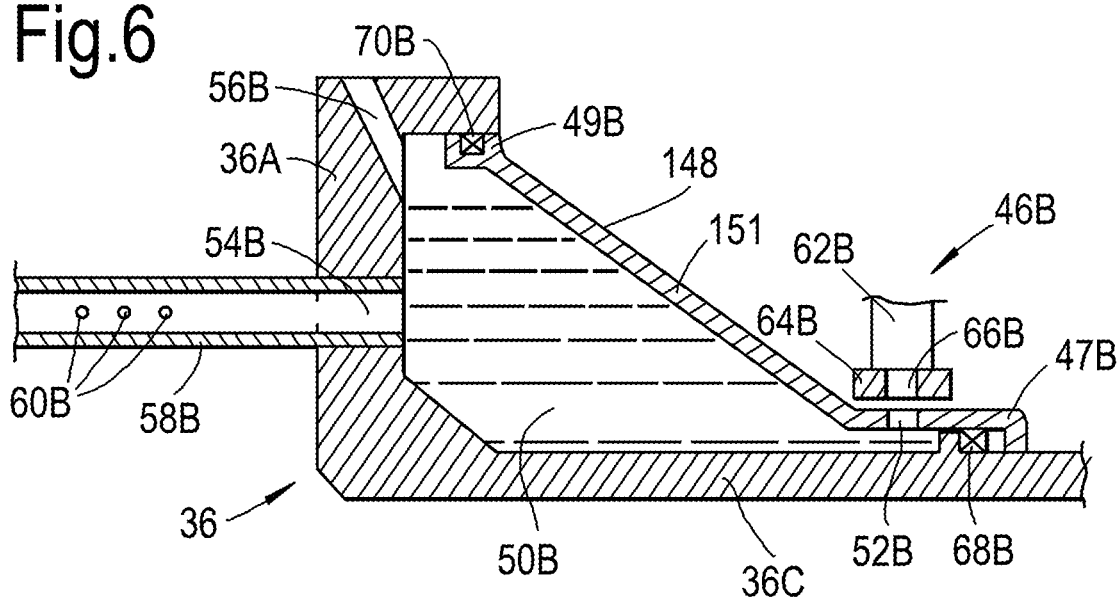
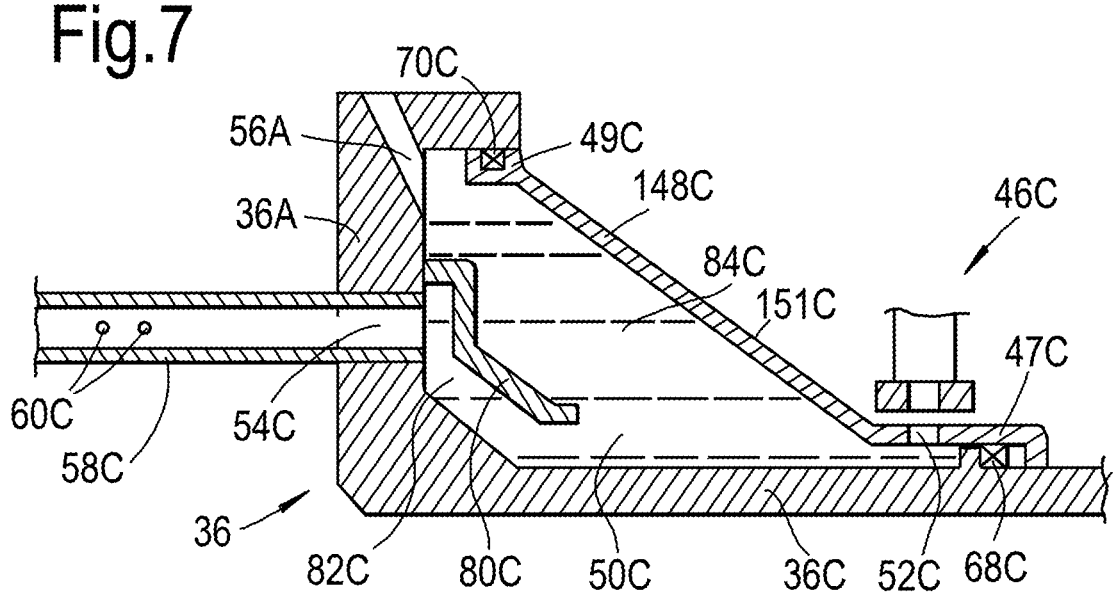

GEARED GAS TURBINE ENGINE

The present disclosure concerns a geared gas turbine engine and in particular to a geared turbofan gas turbine engine or a geared turbo propeller gas turbine engine.

Geared gas turbine engines have a gearbox to drive the fan or propeller. The gearbox may be a planetary gearbox which requires a lubricant supply to supply lubricant to the gears and the bearings of the planet gears. The lubricant lubricates and cools the gears and the bearings of the planet gears. The lubricant is usually supplied to a planet gear carrier and then supplied from the planet gear carrier to the bearings of the planet gears and to the gears. The planet gear carrier is generally provided with several internal passages which are produced in the planet gear carrier by casting and/or machining.

The internal passages within the planet gear carrier generally have a small cross-sectional flow area which may lead to a significant loss of pressure in the lubricant. The internal passages within the planet gear carrier may lead to high stresses within the planet gear carrier or an increase in thickness of the planet gear carrier to accommodate the internal passages with a consequential increase in weight. The total volume of lubricant within the planet gear carrier is relatively small, which is rapidly depleted in the event of an interruption in the lubricant supply. Any pressure fluctuations in the lubricant supply may not be damped out before the lubricant is supplied to the gears or planet gear bearings. The manufacturing tolerances of the internal passages within the planet gear carrier may lead to undesirable differences in supply pressure at the different supply positions. It is expensive to produce the internal passages in the planet gear carrier by casting and/or machining.

According to a first aspect of the disclosure there is provided a gas turbine engine comprising a gearbox, the gearbox comprising a sun gear, an annulus gear, a plurality of planet gears and a planet gear carrier, each planet gear being rotatably mounted in the planet gear carrier by at least one planet gear bearing, the sun gear meshing with the planet gears and the planet gears meshing with the annulus gear, a lubrication system arranged to supply lubricant to the planet gear bearings and one or more of the sun gear, the annulus gear and the planet gears, the planet gear carrier comprising an annular extension, the lubrication system comprising an annular member arranged coaxially around and spaced from the annular extension to define an annular chamber, the annular member being sealed at its ends to the planet gear carrier, the annular chamber having a volume selected to form a reservoir of lubricant, the annular member having at least one inlet aperture to supply lubricant into the annular chamber, the planet carrier having at least one first passage to supply lubricant to one or more of the sun gear, the annulus gear and the planet gears and at least one second passage to supply lubricant to the planet gear bearings.

The annular chamber may have a large volume to form a reservoir of lubricant.

The annular extension may be rotatably mounted in a static structure.

The planet gear carrier may comprise a first ring, a second ring spaced axially from the first ring and a plurality of circumferentially spaced axles extending axially between the first ring and the second ring, each planet gear being rotatably mounted on a respective one of the axles and the annular extension extending from the first ring.

Each planet gear may be rotatably mounted on the planer gear carrier by a journal bearing or at least one roller bearing.

Each planet gear may be rotatably mounted on the planer gear carrier by two roller bearings.

The annular member may comprise a cylindrical portion arranged around the annular extension and a radially extending portion spaced axially from the planet carrier.

An end of the cylindrical portion may be sealed to the annular extension and a radially outer end of the radially extending portion may be sealed to the planet gear carrier.

The radially extending portion may be frustoconical.

Alternatively, the annular member may be frustoconical and arranged around the annular extension.

A radially inner end of the frustoconical annular member may be sealed to the annular extension and a radially outer end of the frustoconical annular member may be sealed to the planet gear carrier.

The planet gear carrier may have a plurality of second passages to supply lubricant to the planet gear bearings.

Each second passage may extend through the first ring of the planet gear carrier to the interior of the respective axle. Each axle may have at least one passage extending there-through to supply lubricant to the respective planet gear bearing.

Alternatively, each second passage may extend through the first ring of the planet gear carrier to at least one internal passage within the respective axle. Each axle may have at least one passage extending there-through from the at least one internal passage to supply lubricant to the respective planet gear bearing.

The planet gear carrier may have a plurality of first passages to supply lubricant to one or more of the sun gear, the annulus gear and the planet gears.

Each first passage may extend axially through the first ring of the planet gear carrier to a respective spray tube. Each spray tube may have at least one aperture to supply lubricant onto the sun gear and a planet gear. Each spray tube may have a plurality of apertures to supply lubricant onto the sun gear and a planet gear.

An annular dividing member may be positioned radially between the annular extension and the annular member, the annular dividing member being sealed to the planet carrier to define a second annular chamber, the second annular chamber being arranged to supply lubricant via the at least one first passage to one or more of the sun gear, the annulus gear and the planet gears and the annular chamber being arranged to supply lubricant via the at least one second passage to the planet gear bearings.

The gas turbine engine may comprise a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

The gas turbine engine may comprising a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

The gas turbine engine may comprise a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

The gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to drive the intermediate-pressure compressor and the low-pressure turbine is arranged to drive the first propulsor and the second propulsor via a gearbox.

The sun gear may be driven by the low-pressure turbine, the annulus gear may be secured to static structure and the planet gear carrier may be arranged to drive the propulsor.

The sun gear may be driven by the low-pressure turbine, the planet gear carrier may be secured to static structure and the annulus gear may be arranged to drive the propulsor.

The planet gear carrier may be driven by the low-pressure turbine, the sun gear may be secured to static structure and the annulus gear may be arranged to drive a propulsor.

The sun gear may be driven by the low-pressure turbine, the planet gear carrier may be arranged to drive a first propulsor and the annulus gear may be arranged to drive a second propulsor.

The propulsor is a fan or a propeller.

According to a second aspect of the disclosure there is provided a gearbox comprising a sun gear, an annulus gear, a plurality of planet gears and a planet gear carrier, each planet gear being rotatably mounted in the planet gear carrier by at least one planet gear bearing, the sun gear meshing with the planet gears and the planet gears meshing with the annulus gear, a lubrication system arranged to supply lubricant to the planet gear bearings and one or more of the sun gear, the annulus gear and the planet gears, the planet gear carrier comprising an annular extension, the lubrication system comprising an annular member arranged coaxially around and spaced from the annular extension to define an annular chamber, the annular member being sealed at its ends to the planet gear carrier, the annular member having at least one inlet aperture to supply lubricant into the annular chamber, the planet carrier having at least one first passage to supply lubricant to one or more of the sun gear, the annulus gear and the planet gears and at least one second passage to supply lubricant to the planet gear bearings.

According to a third aspect of the present disclosure there is provided a method of operating a gas turbine engine, the gas turbine engine comprising a gearbox, the gearbox comprising a sun gear, an annulus gear, a plurality of planet gears and a planet gear carrier, each planet gear being rotatably mounted in the planet gear carrier by at least one planet gear bearing, the sun gear meshing with the planet gears and the planet gears meshing with the annulus gear, a lubrication system arranged to supply lubricant to the planet gear bearings and one or more of the sun gear, the annulus gear and the planet gears, the planet gear carrier comprising an annular extension, the lubrication system comprising a lubricant supply, an annular member arranged coaxially around and spaced from the annular extension to define an annular chamber, the annular member being sealed at its ends to the planet gear carrier, the annular chamber having a volume selected to form a reservoir of lubricant, the annular member having at least one inlet aperture to supply lubricant into the annular chamber, the planet carrier having at least one first passage to supply lubricant to one or more of the sun gear, the annulus gear and the planet gears and at least one second passage to supply lubricant to the planet gear bearings, the method comprising supplying lubricant from the lubricant supply to the annular chamber and supplying lubricant from the annular chamber to the planet gear bearings and at least one of the sun gear, the annulus gear and the planet gears in a first mode of operation and supplying lubricant from the reservoir of lubricant in the annular chamber to the planet gear bearings and at least one of the sun gear, the annulus gear and the planet gears during an interruption in the supply of lubricant from the lubricant supply in a second mode of operation.

The skilled person will appreciate that except where mutually exclusive, a feature described in relation to any one of the above aspects of the invention may be applied mutatis mutandis to any other aspect of the invention.

Embodiments of the disclosure will now be described by way of example only, with reference to the Figures, in which:

FIG. 6 is another further enlarged cross-sectional view of a portion of the planet gear carrier, an annular member and an annular lubricant chamber shown in FIG. 3.

FIG. 7 is an additional further enlarged cross-section view of a portion of the planet gear carrier, an annular member and an annular lubricant chamber shown in FIG. 3.

Figure 1:
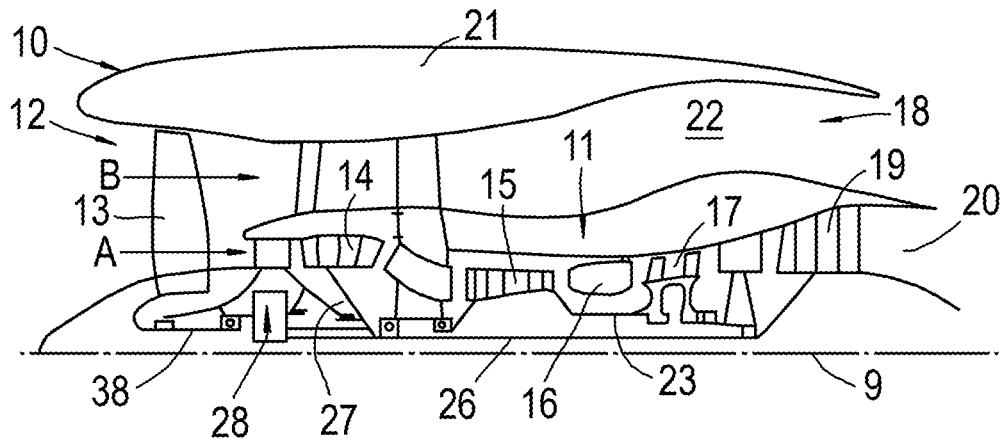
FIG. 1 is a part sectional side view of a geared turbofan gas turbine engine according to the present disclosure.
Figure 2:
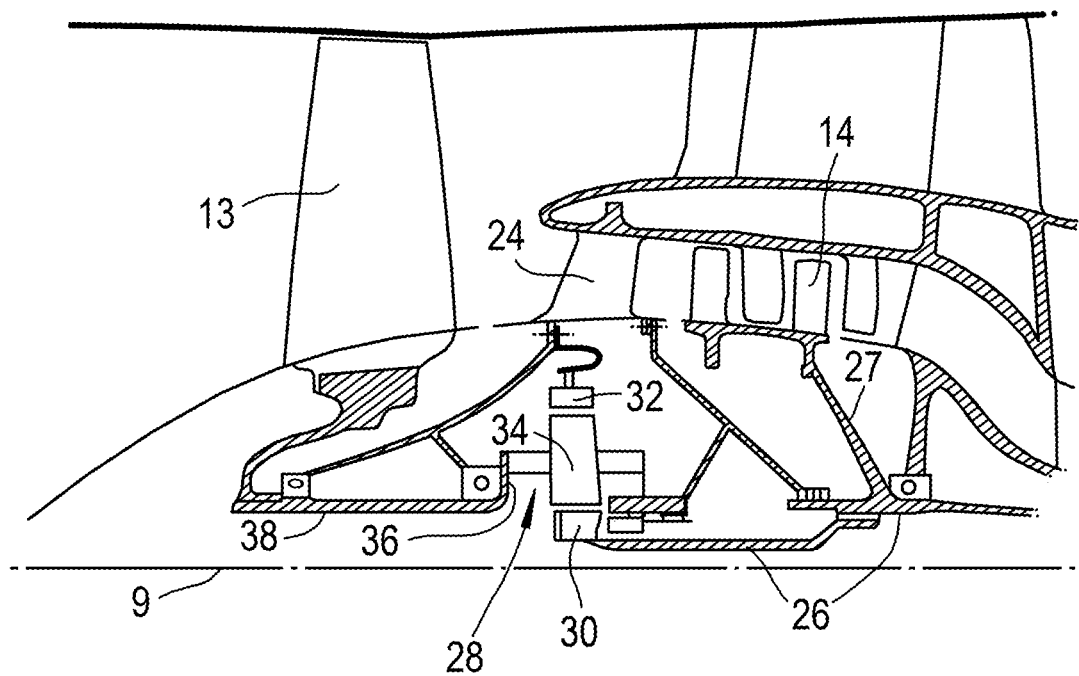
FIG. 2 is an enlarged part sectional side view of a portion of the geared turbofan gas turbine engine shown in FIG. 1.

With reference to FIGS. 1 and 2, a geared turbofan gas turbine engine is generally indicated at 10, having a principal and rotational axis 9. The engine 10 comprises, in axial flow series, an air intake 12, a propulsive fan 13, an intermediate-pressure, or booster, compressor 14, a high-pressure compressor 15, combustion equipment 16, a high-pressure turbine 17, a low-pressure turbine 19 and a core exhaust nozzle 20. The intermediate-pressure compressor 14, the high-pressure compressor 15, the combustion equipment 16, the high-pressure turbine 17 and the low-pressure turbine 19 form a core engine 11. A nacelle 21 generally surrounds the engine 10 and defines the intake 12, a bypass duct 22 and a bypass exhaust nozzle 18.

The gas turbine engine 10 works in the conventional manner so that air entering the intake 12 is accelerated by the fan 13 to produce two air flows: a first air flow A into the intermediate-pressure compressor 14 and a second air flow B which passes through the bypass duct 22 to provide the majority of the propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high and low-pressure turbines 17, 19 before being exhausted through the core nozzle 20 to provide additional propulsive thrust. The high-pressure turbine 17 drives the high-pressure compressor 15 by a shaft 23. The low-pressure turbine 19 drives the intermediate-pressure compressor 14 directly via shafts 26 and 27. The low-pressure turbine 19 drives the fan 13 indirectly via the shaft 26, a gearbox 28 and a shaft 38. The gearbox 28 comprises a sun gear 30, an annulus gear 32, a plurality of planet gears 34 and a planet gear carrier 36. The sun gear 30 meshes with the planet gears 34 and the planet gears 32 mesh with the annulus gear 32. The planet gear carrier 36 constrains the planet gears 34 to precess around the sun gear 30 in synchronicity whilst enabling each planet gear 34 to rotate about its own axis independently. The planet gear carrier 36 is coupled via the shaft 38 to the fan 13 in order to drive its rotation about the engine axis 9. The annulus gear 32 is coupled to a static structure 24. The axes of the planet gears 34 and the axis of the planet gear carrier 36 are parallel to the engine axis 9.

Figure 3:
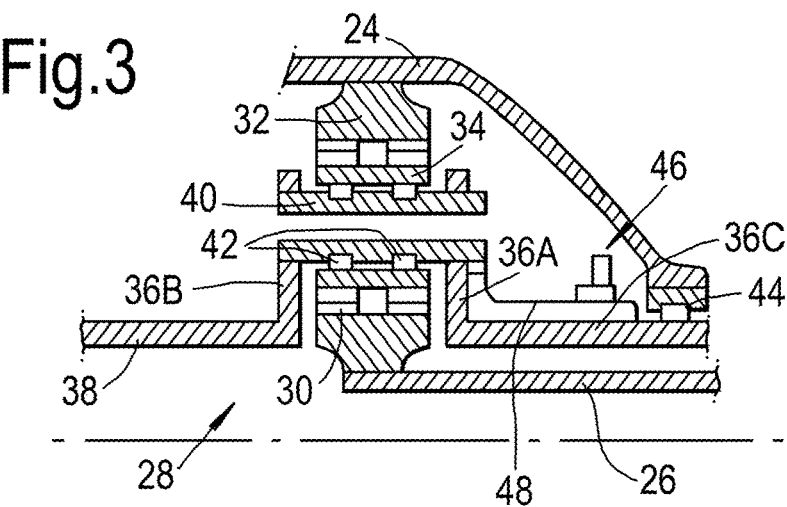
FIG. 3 is an enlarged cross-sectional view though the gearbox shown in FIG. 2.
Figure 4:
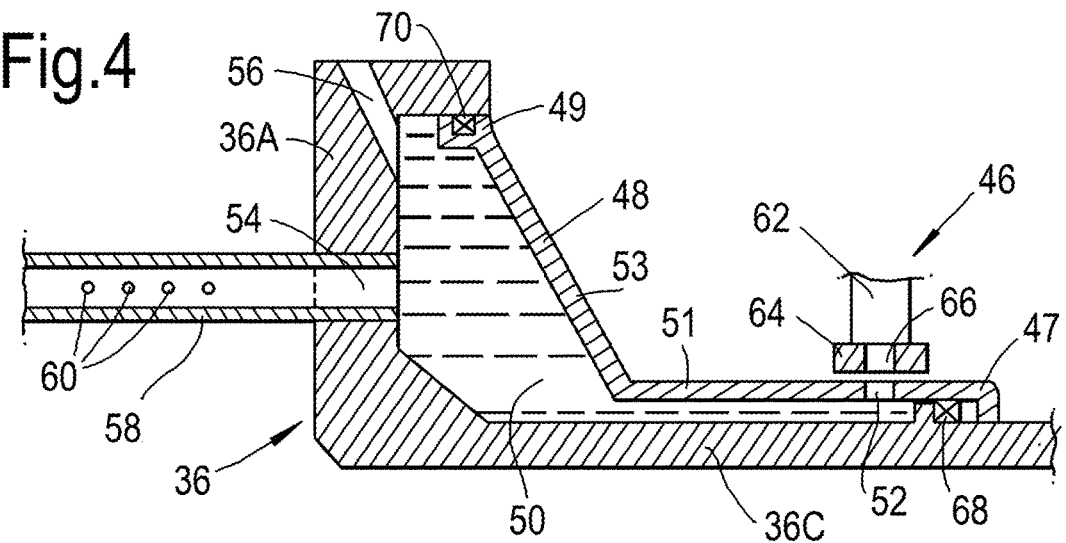
FIG. 4 is a further enlarged cross-sectional view of a portion of the planet gear carrier, an annular member and an annular lubricant chamber shown in FIG. 3.

The gearbox 28 is shown more clearly in FIGS. 3 and 4 and the planet gear carrier 36 comprises a first ring 36A, a second ring 36B spaced axially from the first ring 36A and a plurality of circumferentially spaced axles 40 which extend axially between the first ring 36A and the second ring 36B. Each planet gear 34 is rotatably mounted on a respective one of the axles 40 and an annular extension, e.g. an extension shaft, 36C extends axially from the first ring 36A. Each planet gear 34 is rotatably mounted in the planet gear carrier 36 by at least one planet gear bearing 42. The extension shaft 36C is rotatably mounted in the static structure 24 by a bearing 44.

In this particular embodiment each planet gear 34 is rotatably mounted on the planer gear carrier 36 by two roller bearings 42. Alternatively each planet gear 34 may be rotatably mounted on the planer gear carrier 36 by a journal bearing.

A lubrication system 46 is arranged to supply lubricant to the planet gear bearings 42, the sun gear 30 and the planet gears 34. The lubrication system 46 comprises an annular member 48 arranged coaxially around and spaced from the extension shaft 36C to define an annular chamber 50. The annular member 48 is sealed at its ends to the planet gear carrier 36. The annular member 48 has at least one inlet aperture 52 to supply lubricant into the annular chamber 50. In this example the annular member 48 has a plurality of circumferentially spaced inlet apertures 52. The planet carrier 36 has at least one first passage 54 to supply lubricant to the sun gear 30 and the planet gears 34 and at least one second passage 56 to supply lubricant to the planet gear bearings 42. The annular chamber 50 has a large volume to form a reservoir of lubricant for the sun gear 30, the planet gears 34 and the planet gear bearings 42.

The planet gear carrier 36 has a plurality of circumferentially spaced first passages 54 to supply lubricant to the sun gear 30 and the planet gears 34. Each first passage 54 extends axially through the first ring 36A of the planet gear carrier 36 to a respective spray tube 58. Each spray tube 58 has at least one aperture 60 to supply lubricant onto the sun gear 30 and a respective one of the planet gears 34. Each spray tube 58 in particular has a plurality of axially spaced apertures 60 to supply lubricant onto the sun gear 30 and the respective one of the planet gears 34. Each spray tube 58 is positioned close to the region where the sun gear 30 meshes with a respective one of the planet gears 34 and the apertures 60 in each spray tube 58 directs the lubricant onto the region where the sun gear 30 meshes with a respective one of the planet gears 34.

The planet gear carrier 36 has a plurality of circumferentially spaced second passages 56 to supply lubricant to the planet gear bearings 42. Each second passage 56 extends axially and radially through the first ring 36A of the planet gear carrier 36 and though a respective one of the axles 40 to the interior of the respective axle 40. Each axle 40 also has at least one passage extending radially there-through to supply lubricant to the respective planet gear bearing 42, e.g. to both of the roller bearings 42 or to the journal bearing. Alternatively, each second passage may extend axially and radially through the first ring 36A of the planet gear carrier 36 to at least one internal passage within the respective axle 40. Each axle 40 may have at least one passage extending there-through from the at least one internal passage to supply lubricant to the respective planet gear bearing 42.

The annular member 48 comprises a cylindrical portion 51 arranged coaxially around the extension shaft 36C of the planer gear carrier 36 and a radially extending portion 53 spaced axially from the first ring 36A of the planet gear carrier 36. A downstream end 47 of the cylindrical portion 51 of the annular member 48 is sealed to the extension shaft 36C of the planet gear carrier 36 by an annular seal 68 and an upstream end 49, a radially outer end, of the radially extending portion 53 of the annular member 48 is sealed to the planet gear carrier 36 by an annular seal 70. The radially extending portion 53 in this example is frustoconical. There may be a smoothly curved junction between the cylindrical portion 51 and the frustoconical portion 53 of the annular member 48. Alternatively the downstream end 47 of the cylindrical portion 51 of the annular member 48 may be sealed to the extension shaft 36C of the planet gear carrier 36 by welding, brazing or by providing an interference fit and the upstream end 49, the radially outer end, of the radially extending portion 53 of the annular member 48 may be sealed to the planet gear carrier 36 welding, brazing or by providing an interference fit.

A pipe 62 is arranged to supply lubricant to a lubricant coupling 64 which has at least one outlet aperture 66 to supply lubricant to the annular chamber 50 via the inlet aperture, or apertures, 52 in the annular member 48. In this example the lubricant coupling 64 has a plurality of circumferentially spaced outlet apertures 66 to supply lubricant to the annular chamber 50. The lubricant coupling 64 is mounted on the static structure 24 and lubricant coupling seals (not shown) are provided between the lubricant coupling 66 and the annular member 48. The lubricant coupling 64 is annular and is arranged coaxially around the annular member 48.

The advantage of this arrangement of the present disclosure is that the annular chamber has a relatively large cross-sectional flow area, compared to the previous arrangement, and therefore the pressure losses in the lubricant are reduced and the lubricant may be delivered to the sun gear and planet gears and the planet gear bearings with a more uniform pressure. A further advantage is that the number of passages provided through, or within, the planet gear carrier is reduced and therefore stress concentrations are reduced and the risk of manufacturing non-conformance is reduced. The volume of the annular chamber is larger than the previous arrangement and therefore the volume of the annular chamber may be selected to maintain a reserve of lubricant in the event of a significant interruption in the supply of lubricant from the lubricant supply, lubricant tank. The reserve of lubricant in the annular chamber would be able to maintain some hydraulic pressure due to the centrifugal forces resulting from the rotation of the planet gear carrier and the annular member in the embodiments of the disclosure in which the planet gear carrier is rotatably mounted in the static structure. The reserve of lubricant in the annular chamber may help to damp out any pressure fluctuations in the lubricant supply system before distributing the lubricant to the planet gear bearings and the sun gear and the planet gears. It is relatively easy to manufacture the annular member so as to form the annular chamber compared to casting and/or machining the internal passages in the planet gear carrier.

Figure 5:
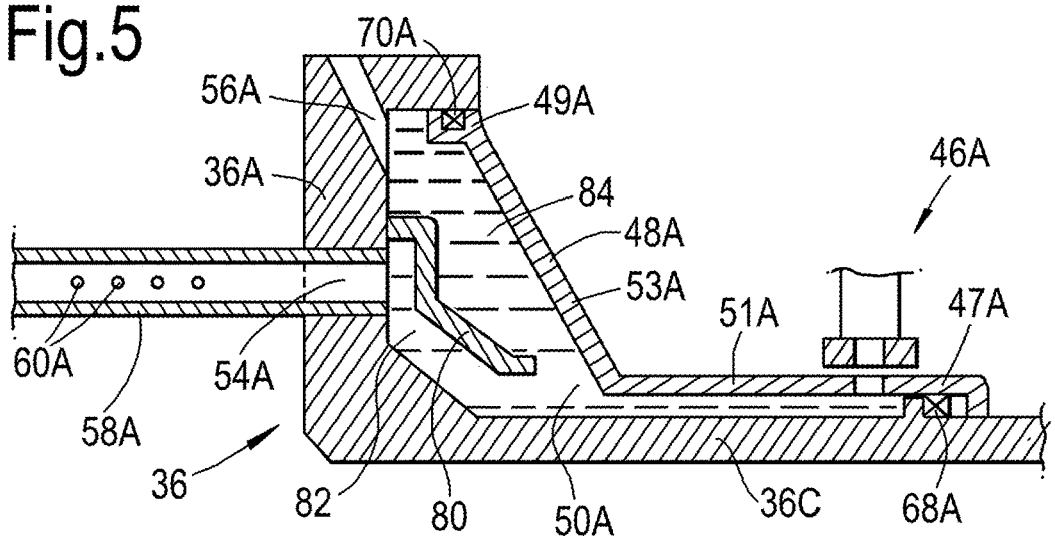
FIG. 5 is an alternative further enlarged cross-section view of a portion of the planet gear carrier, an annular member and an annular lubricant chamber shown in FIG. 3.

An alternative lubrication system 46A for the gearbox 28 is shown in FIG. 5. The lubrication system 46A and the gearbox 28 are substantially the same as those shown in FIGS. 3 and 4 and like parts are denoted by like numerals with a suffix of A. The lubrication system 46A differs in that an annular dividing member 80 is positioned radially between the annular extension, the extension shaft, 36C and the annular member 48A. The annular dividing member 80 is sealed to the first ring 36A of the planet gear carrier 36 to define a second annular chamber 82 and a third annular chamber 84. The second annular chamber 82 is defined between the second annular member 84 and the extension shaft 36C and the third annular chamber 84 is defined between the annular member 48A and the second annular member 80. The second annular chamber 82 is arranged to supply lubricant via the at least one first passage 54A to the sun gear 30 and planet gears 34 and the third annular chamber 84 is arranged to supply lubricant via the at least one second passage 56A to the planet gear bearings 42. The lubricant supplied to the annular chamber 50A is supplied to the second annular chamber 82 and the third annular chamber 84. The volume of the third annular chamber 84 is larger than the volume of the second annular chamber 82. The second annular chamber 82 has a large volume to form a reservoir of lubricant for the sun gear 30 and the planet gears 34 and the third annular chamber 84 has a large volume to form a reservoir of lubricant for the planet gear bearings 42. It is to be noted that the internal diameter of the upstream end of the second annular member 80 is less than the internal diameter of the downstream end of the cylindrical portion 51A of the annular member 48A. There may be a smoothly curved junction between the cylindrical portion 51A and the frustoconical portion 53A of the annular member 48A.

The advantage of this arrangement of the present disclosure is that the volume of the third annular chamber is larger than the volume of the second annular chamber so that there is a greater reserve of lubricant to supply the planet gear bearings because bearings are more sensitive to an interruption in the supply of lubricant from the lubricant supply, lubricant tank, than gear meshes. A further advantage of this arrangement of the present disclosure is that the centrifugal forces on the lubricant within the annular chamber will tend to cause the majority of the lubricant to be supplied to the third annular chamber and any air within the lubricant and the minority of the lubricant will tend to be supplied to the second annular chamber. Thus, the second annular member acts as a separator to separate out any air in the lubricant and supply the air preferentially to the second annular chamber. The second annular member ensures that the amount of air supplied to the third annular chamber is minimised and hence the planet gear bearings are supplied with a minimal amount of, or no, air. It is to be noted that the planet gear bearings are more sensitive to the presence of air within the lubricant and the presence of air within the lubricant may lead to premature failure of the planet gear bearings. On the contrary the lubricant supplied from the second annular chamber to the sun gear and the planet gears may contain air.

An alternative arrangement of lubrication system 46B for the gearbox 28 is shown in FIG. 6. The lubrication system 46B and the gearbox 28 are substantially the same as those shown in FIGS. 3 and 4 and like parts are denoted by like numerals with a suffix of B. The annular member 148 simply comprises a substantially frustoconical member 151 arranged coaxially around the extension shaft 36C of the planer gear carrier 36. A downstream end 47B of the frustoconical member 151 of the annular member 148 is sealed to the extension shaft 36C of the planet gear carrier 36 by an annular seal 68B and an upstream end 49B, a radially outer end, of the frustoconical member 151 of the annular member 148 is sealed to the planet gear carrier 36 by an annular seal 70B. Alternatively the downstream end 47B of the frustoconical member 151 of the annular member 148 may be sealed to the extension shaft 36C of the planet gear carrier 36 by welding, brazing or by providing an interference fit and the upstream end 149B, the radially outer end, of the frustoconical member 151 of the annular member 148 may be sealed to the planet gear carrier 36 welding, brazing or by providing an interference fit. The annular chamber 50B has a large volume to form a reservoir of lubricant for the sun gear 30, the planet gears 34 and the planet gear bearings 42.

An alternative arrangement of lubrication system 46C for the gearbox 28 is shown in FIG. 7. The lubrication system 46C and the gearbox 28 are substantially the same as those shown in FIG. 6 and like parts are denoted by like numerals with a suffix of C. The lubrication system 46C differs in that an annular dividing member 80C is positioned radially between the annular extension, the extension shaft, 36C and the annular member 148C. The annular dividing member 80C is sealed to the first ring 36A of the planet gear carrier 36 to define a second annular chamber 82C and a third annular chamber 84C. The second annular chamber 82C is defined between the second annular member 84C and the extension shaft 36C and the third annular chamber 84C is defined between the annular member 148C and the second annular member 80C. The second annular chamber 82C is arranged to supply lubricant via the at least one first passage 54C to the sun gear 30 and planet gears 34 and the third annular chamber 84C is arranged to supply lubricant via the at least one second passage 56C to the planet gear bearings. The lubricant supplied to the annular chamber 50C is supplied to the second annular chamber 82C and the third annular chamber 84C. The volume of the third annular chamber 84C is larger than the volume of the second annular chamber 82C. The second annular chamber 82C has a large volume to form a reservoir of lubricant for the sun gear 30 and the planet gears 34 and the third annular chamber 84C has a large volume to form a reservoir of lubricant for the planet gear bearings 42. It is to be noted that the internal diameter of the upstream end of the second annular member 80C is less than the internal diameter of the downstream end of the frustoconical member 151C of the annular member 148A.

The arrangements of lubrication system in FIGS. 6 and 7 provide a greater reserve volume of lubricant than those in FIGS. 4 and 5.

Figure 8:
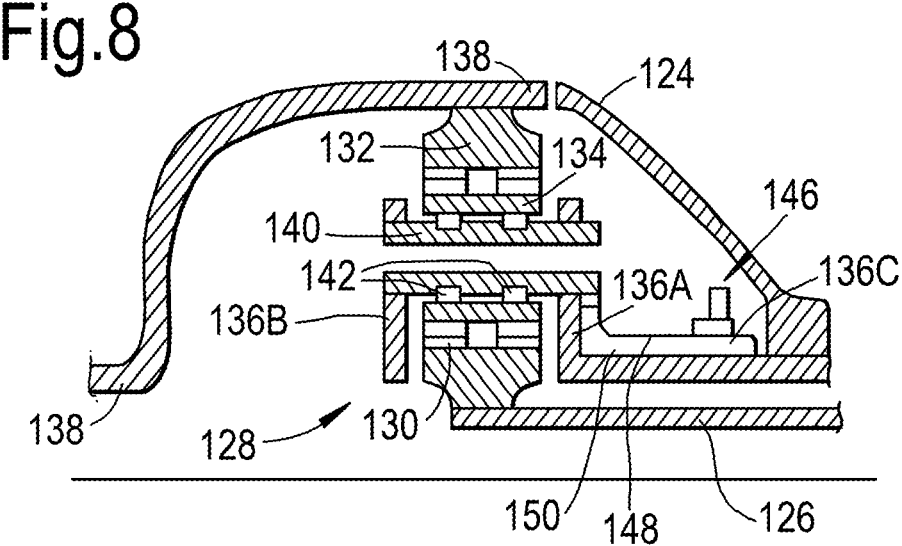
FIG. 8 is an enlarged cross-sectional view though an alternative gearbox according to the present disclosure.

FIG. 8 shows an arrangement in which the low-pressure turbine 19 drives the fan 13 indirectly via the shaft 126, a gearbox 128 and a shaft 138. The gearbox 128 comprises a sun gear 130, an annulus gear 132, a plurality of star gears 134 and a star gear carrier 136. The sun gear 130 meshes with the star gears 134 and the star gears 134 mesh with the annulus gear 132. The star gear carrier 136 enabling each star gear 134 to rotate about its own axis independently. The star gear carrier 136 is coupled to a static structure 124. The annulus gear 132 is coupled via the shaft 138 to the fan 13 in order to drive its rotation about the engine axis 9. The axes of the star gears 134 are parallel to the engine axis 9. The star gear carrier 136 comprises a first ring 136A, a second ring 136B spaced axially from the first ring 136A and a plurality of circumferentially spaced axles 140 which extend axially between the first ring 136A and the second ring 136B. Each star gear 134 is rotatably mounted on a respective one of the axles 140 and an annular extension 136C extends axially from the first ring 136A. Each star gear 134 is rotatably mounted in the star gear carrier 136 by at least one planet gear bearing 142. The annular extension 136C is secured to the static structure 124. In this particular embodiment each star gear 134 is rotatably mounted on the star gear carrier 136 by two roller bearings 142. Alternatively each star gear 134 may be rotatably mounted on the star gear carrier 136 by a journal bearing. A lubrication system 146 is arranged to supply lubricant to the star gear bearings 142, the sun gear 130 and the planet gears 134. The gearbox arrangement 128 of FIG. 8 may be provided with a lubrication system 146 with an annular member 148 and an annular chamber 150 as described with reference to FIG. 4, 5, 6 or 7.

Figure 9:
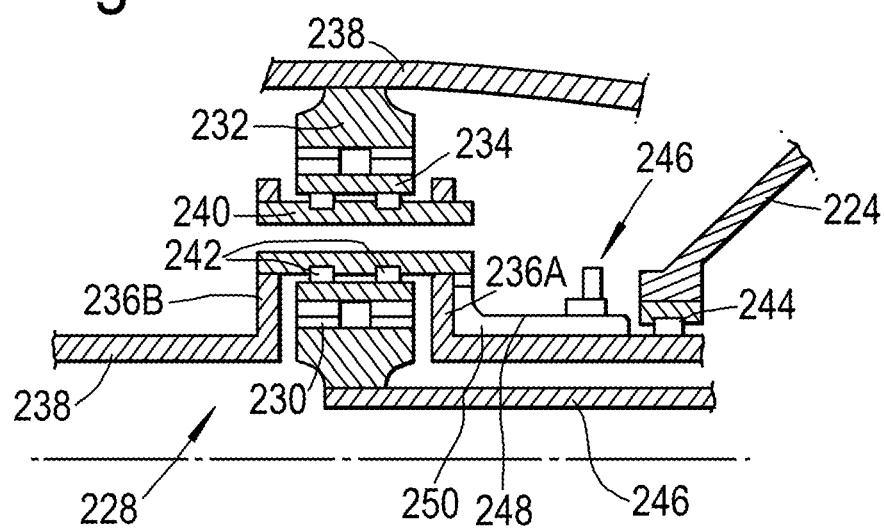
FIG. 9 is an enlarged cross-sectional view though a further gearbox according to the present disclosure.

FIG. 9 shows an arrangement in which the low-pressure turbine 19 drives two fans indirectly via the shaft 226, a gearbox 228 and shaft 238A and 238B. The gearbox 228 comprises a sun gear 230, an annulus gear 232, a plurality of planet gears 234 and a planet gear carrier 236. The sun gear 230 meshes with the planet gears 234 and the planet gears 234 mesh with the annulus gear 232. The planet gear carrier 236 enabling each planet gear 234 to rotate about its own axis independently. The planet gear carrier 236 is coupled via the shaft 238A to a first propulsor (not shown) and the annulus gear 232 is coupled via the shaft 238B to a second propulsor (not shown) in order to drive their rotation about the engine axis 9. The propulsors are driven to rotate in opposite rotational directions. The axes of the planet gears 234 are parallel to the engine axis 9. The planet gear carrier 236 comprises a first ring 236A, a second ring 236B spaced axially from the first ring 236A and a plurality of circumferentially spaced axles 240 which extend axially between the first ring 236A and the second ring 236B. Each planet gear 234 is rotatably mounted on a respective one of the axles 240 and an annular extension 236C extends axially from the first ring 236A. Each planet gear 234 is rotatably mounted in the planet gear carrier 236 by at least one planet gear bearing 242. The annular extension 236C is rotatably mounted in the static structure 224 by a bearing 244. In this particular embodiment each planet gear 234 is rotatably mounted on the planet gear carrier 236 by two roller bearings 242. Alternatively each planet gear 234 may be rotatably mounted on the planet gear carrier 236 by a journal bearing. A lubrication system 246 is arranged to supply lubricant to the planet gear bearings 242, the sun gear 230 and the planet gears 234. The gearbox arrangement 228 of FIG. 9 may be provided with a lubrication system 246 with an annular member 248 and an annular chamber 250 as described with reference to FIG. 4, 5, 6 or 7.

In each of the arrangements described above the sun gear, the annulus gear, the planet gear carrier, or star gear carrier, and the shaft are coaxial.

In each of the arrangements described above the lubricant, e.g. oil, lubricates and cools the sun, annulus and planet gears and the bearings of the planet gears or cools the sun, annulus and star gears and the bearings of the star gears.

As described above, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

Alternatively, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

Alternatively, the gas turbine engine comprises a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

Alternatively the gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine, a low-pressure turbine and a free power turbine, the high-pressure turbine is arranged to directly drive the high-pressure compressor, the low-pressure turbine is arranged to directly drive the low-pressure compressor and the free power turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine and a low-pressure turbine, the high-pressure turbine is arranged to directly drive the high-pressure compressor, the low-pressure turbine is arranged to directly drive the low-pressure compressor and the low-pressure turbine is arranged to drive the first propulsor and the second propulsor via a gearbox.

The sun gear may be driven by a low-pressure turbine, the annulus gear may be secured to static structure and the planet gear carrier may be arranged to drive a propulsor.

The sun gear may be driven by the low-pressure turbine, the planet gear carrier may be secured to static structure and the annulus gear may be arranged to drive a propulsor. In this arrangement the planet gears are termed star gears and the annular extension of the planet gear carrier is secured to the static structure. In this arrangement each planet gear rotates about its own axis and the planet gear carrier does not rotate about the engine axis. The axes of the planet gears are parallel to the engine axis.

The planet gear carrier may be driven by the low-pressure turbine, the sun gear may be secured to static structure and the annulus gear may be arranged to drive a propulsor.

The sun gear may be driven by the low-pressure turbine, the planet gear carrier may be arranged to drive a first propulsor and the annulus gear may be arranged to drive a second propulsor.

The propulsor may be a fan or a propeller.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising:
a gearbox, the gearbox comprising a sun gear, an annulus gear, a plurality of planet gears and a planet gear carrier, wherein:
each planet gear of the plurality of planet gears is rotatably mounted in the planet gear carrier by a planet gear bearing, and
the sun gear meshes with the plurality of planet gears and the plurality of planet gears mesh with the annulus gear; and
a lubrication system arranged to supply lubricant to the planet gear bearing and one or more of the sun gear, the annulus gear and the plurality of planet gears, wherein:
the planet gear carrier comprises an annular extension,
the lubrication system comprises an annular member arranged coaxially around and spaced from the annular extension to define an annular chamber,
ends of the annular member are sealed to the planet gear carrier,
the annular chamber has a volume selected to form a reservoir of the lubricant,
the annular member has at least one inlet aperture to supply the lubricant into the annular chamber, and
the planet gear carrier has at least one first passage formed in the planet gear carrier to supply the lubricant to the one or more of the sun gear, the annulus gear and the plurality of planet gears and at least one second passage formed in the planet gear carrier and radially outside the at least one first passage to supply the lubricant to the planet gear bearing.

2. The gas turbine engine as claimed in claim 1 wherein the annular extension is rotatably mounted in a static structure.

3. The gas turbine engine as claimed in claim 1 wherein the planet gear carrier comprises a first ring, a second ring spaced axially from the first ring and a plurality of circumferentially spaced axles extending axially between the first ring and the second ring, the each planet gear of the plurality of planet gears being rotatably mounted on a respective one of the plurality of circumferentially spaced axles and the annular extension extending from the first ring.

4. The gas turbine engine as claimed in claim 1 wherein the each planet gear of the plurality of planet gears is rotatably mounted on the planet gear carrier by a bearing, the bearing is selected from a group that includes a journal bearing and at least one roller bearing.

5. The gas turbine engine as claimed in claim 4 wherein the each planet gear of the plurality of planet gears is rotatably mounted on the planet gear carrier by two roller bearings.

6. The gas turbine engine as claimed in claim 1 wherein the annular member comprises a cylindrical portion arranged around the annular extension and a radially extending portion spaced axially from the planet carrier.

7. The gas turbine engine as claimed in claim 6 wherein an end of the cylindrical portion is sealed to an annular shaft and a radially outer end of the radially extending portion is sealed to the planet gear carrier.

8. The gas turbine engine as claimed in claim 7 wherein the radially extending portion is frustoconical.

9. The gas turbine engine as claimed in claim 1 wherein the planet gear carrier has a plurality of second passages to supply the lubricant to the planet gear bearing.

10. The gas turbine engine as claimed in claim 9 wherein each second passage of the plurality of second passages extends through the first ring of the planet gear carrier to an interior of a respective axle of a plurality of axles.

11. The gas turbine engine as claimed in claim 10 wherein each axle of the plurality of axles has at least one passage extending there-through to supply the lubricant to the planet gear bearing.

12. The gas turbine engine as claimed in claim 1 wherein the planet gear carrier has a plurality of first passages to supply the lubricant to the one or more of the sun gear, the annulus gear and the plurality of planet gears.

13. The gas turbine engine as claimed in claim 12 wherein each first passage of the plurality of first passages extends axially through the first ring of the planet gear carrier to a respective spray tube of a plurality of spray tubes.

14. The gas turbine engine as claimed in claim 13 wherein each spray tube of the plurality of spray tubes has at least one aperture to supply the lubricant onto the sun gear and a planet gear of the plurality of planet gears.

15. The gas turbine engine as claimed in claim 14 wherein the each spray tube of the plurality of spray tubes has a plurality of apertures to supply the lubricant onto the sun gear and the planet gear of the plurality of planet gears.

16. The gas turbine engine as claimed in claim 1 comprising an annular dividing member positioned radially between the annular extension and the annular member, the annular dividing member being sealed to the planet gear carrier to divide the annular chamber into a first annular chamber and a second annular chamber, the second annular chamber being arranged to supply the lubricant via the at least one first passage to the one or more of the sun gear, the annulus gear and the plurality of planet gears and the first annular chamber being arranged to supply the lubricant via the at least one second passage to the planet gear bearing.

17. The gas turbine engine as claimed in claim 1 comprising a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via the gearbox.

18. The gas turbine engine as claimed in claim 17 wherein the sun gear is driven by the low-pressure turbine, the annulus gear is secured to a static structure and the planet gear carrier is arranged to drive the propulsor.

19. The gas turbine engine as claimed in claim 1, wherein:
the lubrication system includes a lubricant coupling, the lubricant coupling being mounted on a static structure,
the annular member includes a cylindrical portion arranged around the annular extension and a radially extending portion spaced axially from the planet gear carrier,
an end of the cylindrical portion is sealed to the annular extension and a radially outer end of the radially extending portion is sealed to the planet gear carrier,
the lubricant coupling is annular and is arranged coaxially around the annular member, and
the lubricant coupling has at least one outlet aperture to supply the lubricant to the annular chamber via the at least one inlet aperture in the annular member.

20. A gearbox comprising:
a sun gear;
an annulus gear;
a plurality of planet gears; and
a planet gear carrier, wherein:
   each planet gear of the plurality of planet gears is rotatably mounted in the planet gear carrier by a planet gear bearing, wherein:
      the sun gear meshes with the plurality of planet gears and the plurality of planet gears meshing with the annulus gear; and
   a lubrication system arranged to supply lubricant to the planet gear bearing and one or more of the sun gear, the annulus gear and the plurality of planet gears, wherein:
      the planet gear carrier comprises an annular extension,
      the lubrication system comprises an annular member arranged coaxially around and spaced from the annular extension to define an annular chamber,
      ends of the annular member are sealed to the planet gear carrier,
      the annular chamber has a volume selected to form a reservoir of the lubricant,
      the annular member has at least one inlet aperture to supply the lubricant into the annular chamber, and
      the planet gear carrier has at least one first passage formed in the planet gear carrier to supply the lubricant to the one or more of the sun gear, the annulus gear and the plurality of planet gears and at least one second passage formed in the planet gear carrier and radially outside the at least one first passage to supply the lubricant to the planet gear bearing.

21. A method of operating a gas turbine engine, the gas turbine engine comprising:
a gearbox, the gearbox comprising a sun gear, an annulus gear, a plurality of planet gears and a planet gear carrier, wherein:
   each planet gear of the plurality of planet gears is rotatably mounted in the planet gear carrier by a planet gear bearing, and
   the sun gear meshes with the plurality of planet gears and the plurality of planet gears mesh with the annulus gear; and
a lubrication system arranged to supply lubricant to the planet gear bearing and one or more of the sun gear, the annulus gear and the plurality of planet gears, wherein:
   the planet gear carrier comprises an annular extension,
   the lubrication system comprises a lubricant supply, an annular member arranged coaxially around and spaced from the annular extension to define an annular chamber,
   ends of the annular member are sealed to the planet gear carrier, the annular chamber has a volume selected to form a reservoir of the lubricant,
   the annular member has at least one inlet aperture to supply the lubricant into the annular chamber, and
   the planet gear carrier has at least one first passage formed in the planet dear carrier to supply the lubricant to the one or more of the sun gear, the annulus gear and the plurality of planet gears and at least one second passage formed in the planet gear carrier and radially outside the at least one first passage to supply the lubricant to the planet gear bearing, the method comprising:
supplying the lubricant from the lubricant supply to the annular chamber and supplying the lubricant from the annular chamber to the planet gear bearing and at least one of the sun gear, the annulus gear and the plurality of planet gears in a first mode of operation, and
supplying the lubricant from the reservoir of lubricant in the annular chamber to the planet gear bearing and the at least one of the sun gear, the annulus gear and the plurality of planet gears during an interruption in the supply of the lubricant from the lubricant supply in a second mode of operation.

* * * * *